United States Patent Office 3,495,093
Patented Feb. 10, 1970

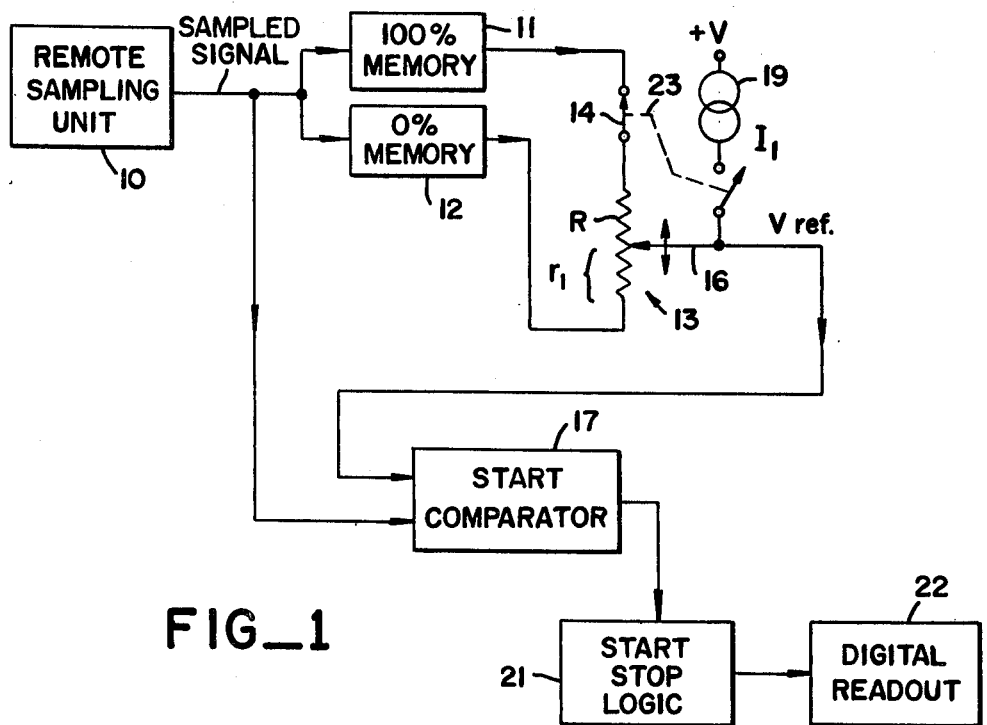
FIG_1
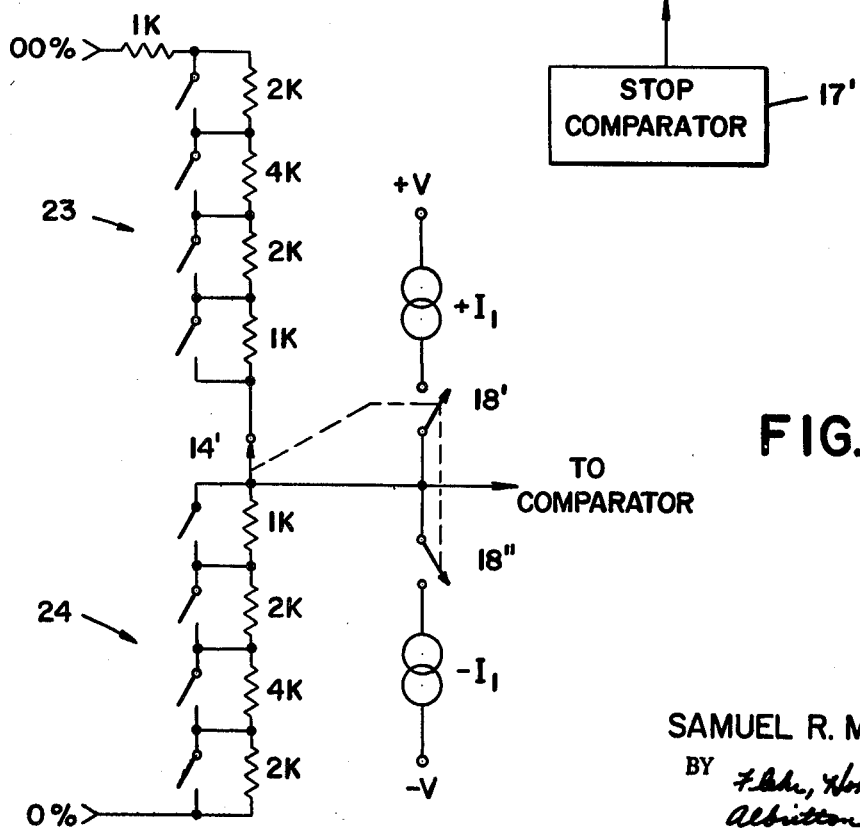
FIG_2
INVENTOR.
SAMUEL R. McCUTCHEON
ATTORNEYS

3,495,093
CONTROL CIRCUIT FOR DERIVING PERCENTAGE AND VOLTAGE OFFSET VALUES
Samuel R. McCutcheon, Saratoga, Calif., assignor to Automated Measurements Corporation, Los Gatos, Calif., a corporation of California
Filed Dec. 12, 1967, Ser. No. 689,972
Int. Cl. H02j 1/10, 3/38
U.S. Cl. 307—52          4 Claims

ABSTRACT OF THE DISCLOSURE

A control circuit is coupled to a remote sampling unit for testing, e.g., integrated circuits. A sampled test signal is produced which is coupled to memory devices which produces 100% and 0% signals. These two signals are coupled to a voltage divider which produces either a percentage of the difference between the two signals or a voltage offset from one of them. The latter is achieved by a constant current generator coupled to the output of the voltage divider which is switched in when a voltage offset is desired. At the same time, the other reference signal source is decoupled from one end of the voltage divider. The total resistance of the voltage divider is related to the magnitude of the reference current by a factor of 10 in order to produce a factor of 10 correlation between the percentage and voltage offset outputs.

Background of the invention

The present invention is directed in general to a control circuit for deriving from a pair of reference signals both percentage and voltage offset values.

In the measurement of parameters of, for example, integrated circuit devices, a signal pulse is applied to the device and the resultant output from the device under test is then analyzed and compared with the original signal. Thus, such parameters as rise time and decay time are obtained. In order to reduce the effective frequency of the test waveforms, a sampling system is utilized which reconstructs the test signal on a longer time base. Such a sampling system is disclosed and claimed in a copending application entitled Sampling System and Apparatus for Testing Electronic Devices in the name of Samuel R. McCutcheon, Ser. No. 600,836, filed Dec. 12, 1966, and assigned to the present assignee.

As disclosed in the above copending application, the measuring system establishes reference levels to provide a basis for comparison with successive measurements. Start and stop points for time measurements are referred to these reference level. In a normal measurement cycle, two successive sets of samples are made on a repetitive waveform. In a first set of samples, the reference levels are established by a memory circuit. In the second set, comparator circuits start and stop the testing procedure when the test signal waveform coincides with the preset start and stop points. The waveform is reconstructed between these points and in addition by the use of a counter digital readout of these points is obtained for further analytical use. Normally, the reference levels used in the above sampling technique are the 0% or the relative ground for the test waveforms and the 100% or peak point. It is desirable that the start and stop points can be expressed either as a percentage of the difference between the two reference levels or in an actual voltage with respect to a chosen one of them.

Summary of invention and objects

It is therefore a general object of the present invention to provide an improved control circuit for deriving from a pair of reference signals both percentage and voltage offset values which can be used as start and stop points in a sampling test system.

It is another object of the invention to provide a circuit as above which is easily programmable and in which common programming means are used for programming both percentage and voltage offset values.

In accordance with the above objects, there is provided a control circuit which includes first and second reference signal sources and a voltage divider means having two input terminals. These terminals are respectively coupled to the first and second reference signals circuit sources. The voltage divider means includes variable output means for providing a selected percentage of the difference between the two reference signals. A constant current source is also provided and switching means for coupling the constant current source to the variable output means. The switching means concurrently decouples one of the reference signal sources from the voltage divider means at the same time that the constant current source is coupled to the voltage divider for providing an output signal on the output means having a predetermined voltage offset from the other reference signal sources.

Brief description of drawings

FIGURE 1 is the block diagram of a control circuit embodying the present invention; and FIGURE 2 is a schematic circuit of an alternative embodiment of a portion of FIGURE 1 which is programmable.

Description of the preferred embodiments

Referring first to FIGURE 1, a remote sampling unit 10 provides a sampled test signal which is coupled to a 100% memory 11 and a 0% memory 12. Details of the sampling procedure are fully disclosed in the above mentioned copending application. The memory circuits remember or store the level of the input signal at selected times which in practice may either be the 0% or 100% level of the signal. Thus, the 100% stored level is a first reference signal and the 0% stored level is a second reference signal.

In accordance with the invention, these reference signals are coupled to a voltage divider 13 comprising a resistor R coupled between the 0% and 100% reference signal lines which is in series with a switch 14. Resistor R constitutes the effective input impedance of the voltage divider. A moving contact arm 16 couples the desired percentage of the difference between the 0% and 100% reference signals to start comparator 17. Also coupled to moving contact arm 16 through a switch 18 is a constant current source 19 producing a current $I_1$ of a positive polarity. Voltage divider 13 as shown has its moving contact 16 located at the $r_1$ resistance point.

Coupled to comparator 17 through switches 19 are the 0% and 100% signals themselves. The start comparator 17 generates a start signal and a similar stop comparator 17′, a stop signal to determine the testing interval by means of the start-stop logic circuitry 21. This in turn is coupled to digital readout circuits 22 to provide for digital readout of the time interval between selected start and stop points.

Thus, in actual practice, another divider 13 and associated circuits would be coupled to stop comparator 17′.

Referring now again to the voltage divider 13, switches 14 and 18 are coupled by a linkage 23 so that when switch 18 is opened switch 14 will be closed. This condition provides for the application of both the 100% and 0% signals across the resistor R whereby the percentage value of the combined reference signals is provided by the moving contact 16. However, if a voltage offset value is desired from, for example, the 0% reference signal, switch 18 is closed opening switch 14. Thereafter the constant current source 19 provides a reference offset voltage on line 16 as determined by the following equation:

$$V_{\text{ref. offset}} = 0\% + I_1 r_1 \quad (1)$$

It should be obvious from the above equation that by reversing the sign of $I_1$ the voltage offset may be subtracted from the 0% reference signal.

Similarly, the V reference for a percentage measurement is shown by Equation 2:

$$V_{\text{ref. percent}} = r_1/R \ (100\% - 0\%) \quad (2)$$

From inspection of Equations 1 and 2, it is apparent that if the product $I_1R$ has a value which is a power of 10, then the offset voltage will be related to the actual percent by a power of 10.

For example, assume that R is equal to 5K and $I_1$ is equal to 2 milliamperes. If moving contact 16 is set at 12%, $r_1$ would equal .6K, meaning that the offset voltage produced would be .6K×2 ma. or 1.2 volts. Thus, by a single setting of the variable output means which includes moving contact 16, the percentage $V_{\text{ref.}}$ (12%) may be correlated by a factor of a power of ten with the offset reference voltage (1.2 volts).

FIGURE 2 illustrates an alternative embodiment for the voltage divider and is in the form of a bridge designated 13'. Instead of a moving contact arm 16 the output of the voltage divider is at 16', a fixed location. This bridge provides a constant input impedance as in the case of the potentiometer 13. This is achieved by use of first section 23 and a second section 24, each having a string of series connected resistors. Individual shunting switches shunt the 1K, 2K, 4K value resistors in section 23 and similar corresponding resistors in section 24. In operation a constant input impedance is maintained by closing a corresponding switch in one section with the opening of a switch in the other section. The switches are coupled to remotely controlled actuating devices (not shown) which are easily controlled by a computer input. The two sections of the bridge are coupled by switch 14' which is selectively ganged to the switches 18' and 18" corresponding to switch 18 of FIGURE 1 to cause an output means 16' to reflect a voltage offset instead of a percentage measurement. Switches 18' and 18" selectively couple to positive and negative polarity current sources to provide a voltage offset of any desired polarity. In other respects, the operation of the circuit of this bridge is similar to that of the voltage divider in FIGURE 1 in providing a power of 10 correspondence between the percentage and voltage offset outputs.

Thus, the present invention provides an improved control circuit for deriving from a pair of reference signals both percentage and voltage offset values. There is required, as more specifically illustrated in FIGURE 2, only a single programming of switches by a power of 10, thus simplifying the use of the control circuit.

What is claimed is:
1. A control circuit for deriving from a pair of reference signals both percentage and voltage offset values, said circuit comprising, first and second reference signal sources, voltage divider means having two input terminals respectively coupled to said first and second reference signal sources including variable output means for providing a selected percentage of the difference between said two reference signals, a constant current source, and switching means for coupling said constant current source to said output means and concurrently decoupling one of said reference signal sources from said voltage divider means for providing an output signal on said output means having a predetermined voltage offset from the other reference signal source.

2. A control circuit as in claim 1 in which said voltage divider has a predetermined effective input impedance and in which said constant current source produces a current of a predetermined magnitude such that the product of said current magnitude and said effective input impedance is a power of ten, whereby said percentage and offset values for the same setting of said variable output means are related by a power of ten.

3. A control circuit as in claim 1 in which said voltage divider includes two sections coupled respectively to said two input terminals each of said sections including a string of series connected resistors with individual shunting switches across each resistor for providing a constant input impedance.

4. A control circuit as in claim 1 in which said constant current source is of a predetermined first polarity to provide a voltage offset in the direction of said first polarity together with a constant current source of a second and opposite polarity coupled to said output means to provide a voltage offset in the direction of said second polarity.

References Cited
UNITED STATES PATENTS
2,834,892  5/1958  Martin _____ 307—52

ROBERT K. SCHAEFER, Primary Examiner

H. J. HOHAUSER, Assistant Examiner